United States Patent [19]

Oyama et al.

[11] Patent Number: 5,797,689
[45] Date of Patent: *Aug. 25, 1998

[54] AVOIDING MEMORY FRAGMENTATION IN PRINTERS

[75] Inventors: Alan J. Oyama; James S. Boyce, both of Boise; Patrick O. Sandfort, Meridian, all of Id.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 591,077

[22] Filed: Jan. 24, 1996

[51] Int. Cl.$^6$ ............................................. G06F 12/00
[52] U.S. Cl. ........................... 400/74; 400/61; 395/115; 395/116
[58] Field of Search .................. 400/74, 61, 76; 395/114, 115, 116

[56] References Cited

U.S. PATENT DOCUMENTS 5,413,419  5/1995  Oami et al. .................................. 400/61
5,479,587  12/1995  Campbell et al. ....................... 395/116

OTHER PUBLICATIONS

"Measuring Fragmentation" by James Harrington, Dr. Dobb's Journal, Apr. 1993, v 18, n 4, pp. 66,68,70,92.

"The Art of Computer Programming", Donald E. Knuth, Addison-Wesley Publishing Company, pp. 434–454, 596–605.

Primary Examiner—Edgar S. Burr
Assistant Examiner—Steven S. Kelley

[57] ABSTRACT

Memory fragmentation in a page printer is avoided by assessing the current extent of memory fragmentation and memory utilization before allocating memory for describing a portion of a next page to be printed. In one embodiment, the assessment includes a weighted average of a normalized standard deviation of current free memory block sizes (indicating fragmentation) and the current percent utilization of memory. A page printer in one embodiment has insufficient memory for bit for bit images of entire pages to be printed. However, a high page printing rate is nonetheless maintained by avoiding interruptions in interface communications and data processing that result when there is insufficient memory to support an allocation request for a contiguous block size. Memory allocation for a new page to be printed is deferred until an assessment of memory fragmentation and utilization is favorably compared to a limit. Processing of a new page with consequential increased fragmentation and increased utilization is, therefore, begun at a time when a memory-out condition and subsequent delays are less likely to arise.

28 Claims, 3 Drawing Sheets

AVOIDING MEMORY FRAGMENTATION IN PRINTERS

FIELD OF THE INVENTION

Embodiments of the present invention relate to computer systems with printers and to means and methods for managing memory in printers.

BACKGROUND OF THE INVENTION

As an introduction to the problems solved by the present invention, consider the conventional page printer with paper jam recovery capability. A page printer prints on sequential separate sheets of paper. Such a printer maintains a complete description of each page until that page exits the printer. If a paper jam should arise before the page exits the printer, the page is reprinted without manual intervention as soon as the jam is cleared.

Such printers manage a modest internal memory to support jam recovery as well as communications from a computer system or network connected to the printer. It is not economical to receive from a network or to store for jam recovery an entire bit for bit image of a page at conventional print resolution. Therefore, the printer manages its memory by allocating blocks on an as needed basis to communications and page formatting routines. Such routines request allocation by defining the requested block size to the allocation routine and receiving a pointer to an allocated block when the request is granted. A complete description of a page conventionally includes many allocated blocks.

Each block is a contiguous group of addresses. The number of addresses in a block is the block size. Each allocated block is released and added to a list of unallocated blocks when no longer needed. Adjacent unallocated blocks are combined, i.e. coalesced, to assure that large contiguous blocks of memory can be allocated in the future. Currently allocated blocks and currently unallocated blocks, all of various sizes, divide memory at random as a consequence of the interplay between routines that request and discard memory. The extent of such division is called memory fragmentation.

Conventional printer improvements have relied upon improved printer processing efficiency. As printer processing has become more efficient, memory fragmentation has increased. For example, one way to increase printer throughput is to decrease processing time by retaining some processing results for possible future use. Character formatting results are retained for possible use on subsequent pages. Retained blocks consequently exist at scattered locations in memory, increasing fragmentation.

The demand for low cost, high throughput, high resolution page printers exacerbates the need to relieve memory fragmentation. A continuous high throughput printing rate is difficult to achieve with an economically limited memory size. The printing rate degrades when processing is stopped by a memory-out condition. Such a condition can arise when memory becomes so fragmented that a page formatting or communication routine's request for an unallocated block is denied. The request is conventionally granted only after all pages in the paper path have exited the printer and allocated blocks for those pages have been deallocated. The interruption in processing at the printer can also interrupt communications with the network and computer to which the printer is connected. Delays in the transmission of page printing data consequently degrade performance of the network and degrade performance of the computer system as well.

In view of the problems described above and related problems that consequently become apparent to those skilled in the applicable arts, the need remains in computer systems with printers for means and methods for managing memory in printers.

SUMMARY OF THE INVENTION

Accordingly, a printer in one embodiment of the present invention includes a memory, a processor, and a print engine. The memory, in operation, contains a first allocated block. The allocated block stores a first description that describes a first page. Also contained in memory is a list of unallocated block sizes. The processor, coupled to the memory, prepares the first description, computes a sum responsive to a plurality of sizes from the list, and allocates, in response to the sum, an unallocated block from the list for processing a second page. The print engine, in response to the processor, when interrupted during printing of the first page, reprints the entire first page followed by the second page.

When the possibility of a memory-out condition is made remote, continuous printing is sustained. According to a first aspect of the embodiments summarized above, the sum reflects memory utilization. By allocating memory in response to the sum, memory fragmentation is avoided. According to another embodiment, the sum includes a variance of a plurality of unallocated block sizes. According to a first aspect of such an embodiment, the sum reflects memory fragmentation. By allocating memory in response to the sum, memory fragmentation is avoided.

According to yet another embodiment, a computer system sustains continuous printing. The system includes a computer, and a printer. The computer describes a first page and a second page to be printed in sequence. The printer includes means for calculating a memory assessment and means for deferring memory allocation. The assessment includes a variance of block sizes. In response to the assessment, an allocation for the second page is deferred.

The present invention may be practiced according to a method for avoiding memory fragmentation in a page printer. The method includes the steps of comparing a memory assessment to a limit before allocating memory for describing a portion of a next page to be printed.

According to a first aspect of such a method, continuous printing is sustained as described above. In contrast, a block allocated without the invention and retained for jam recovery necessarily prevents optimal coalescing of memory when a previously printed page exits the printer.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

3

Figure 1:
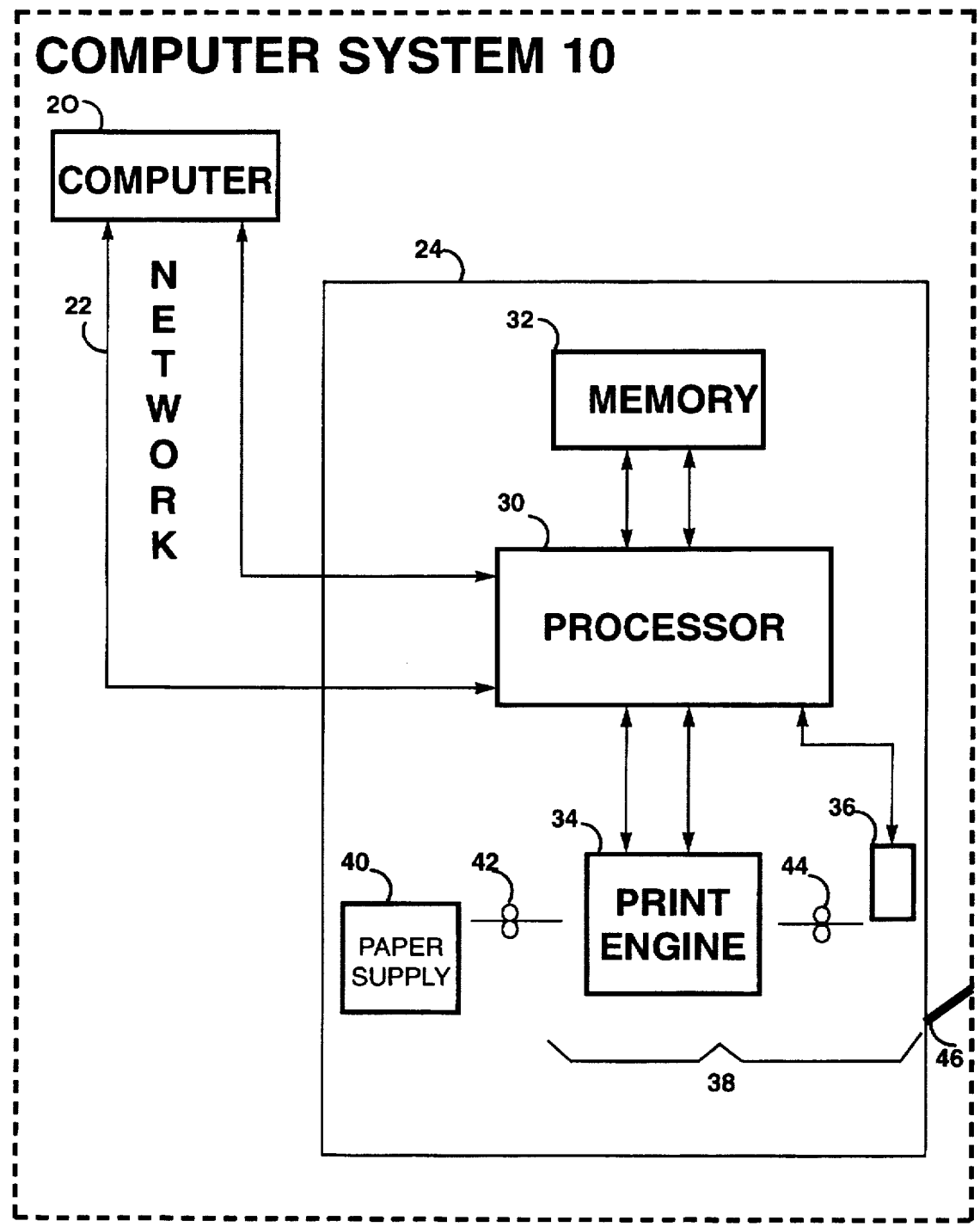
FIG. 1 is a functional block diagram of a computer system of the present invention.
Figure 2:
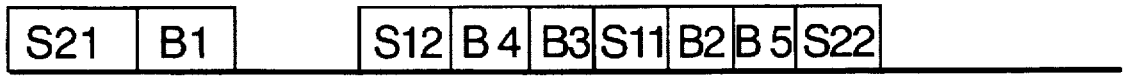
FIG. 2 is a memory utilization diagram of the printer memory shown in FIG. 1 at a time when allocations for a first page and a second page have been made.
Figure 4:
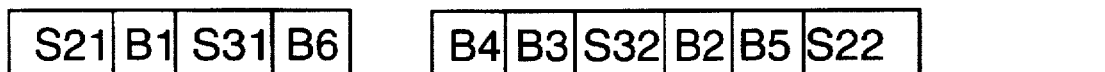

FIG. 4 is a memory utilization diagram of the printer memory shown in FIG. 1 at a time, after the time in FIG. 2, when allocations for a first page have been deallocated and allocations for part of a third page have been made.

Figure 5:
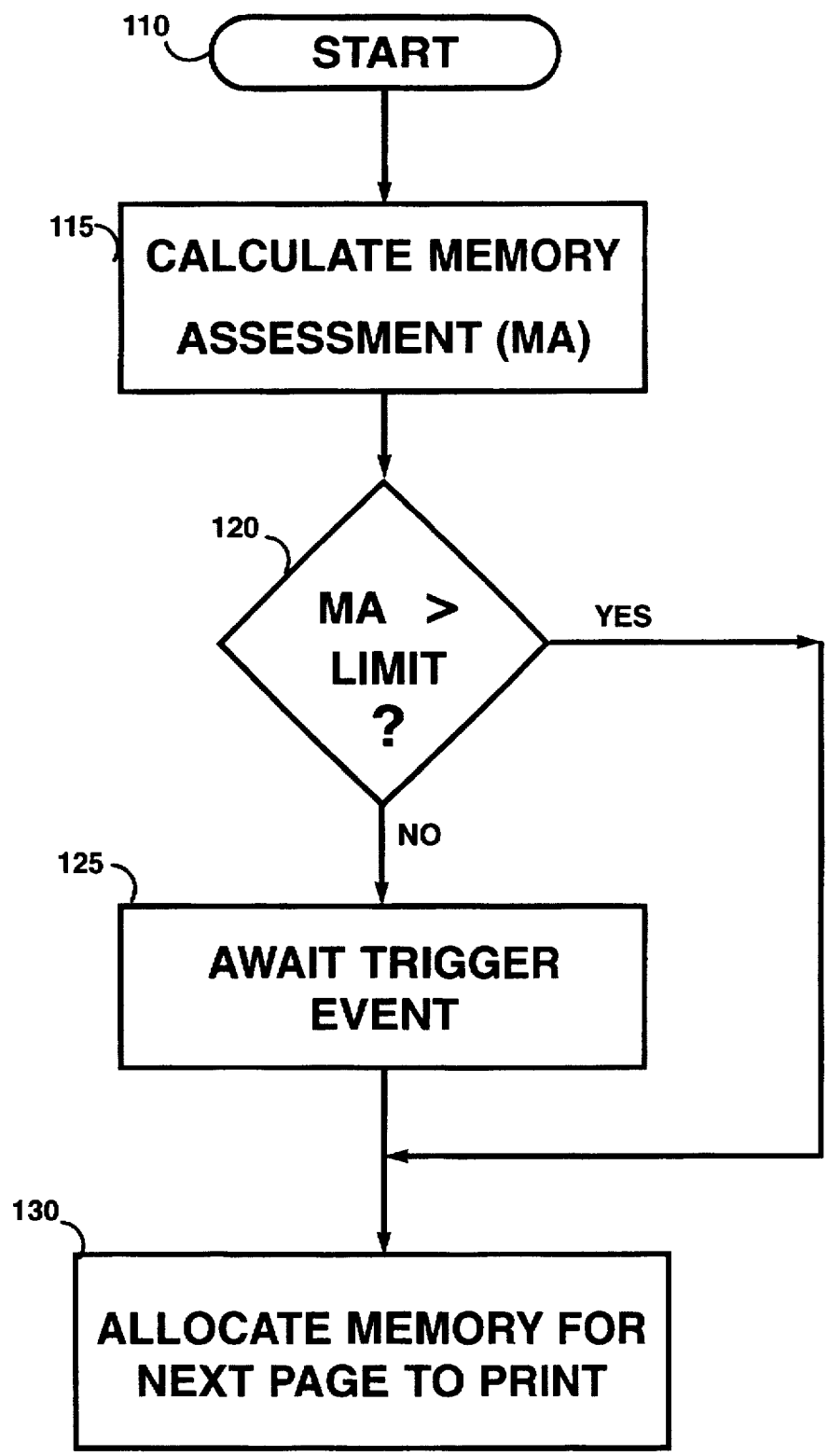

FIG. 5 is a flow chart of a method of the present invention.

A person having ordinary skill in the art will recognize where portions of a diagram have been expanded to improve the clarity of the presentation.

In each memory utilization diagram, the horizontal axis represents contiguous memory addresses from left (low memory) to right (high memory). Each named block on the diagram represents a contiguous group of addresses that have been allocated. A space between blocks represents an unallocated block.

DETAILED DESCRIPTION OF THE INVENTION

FIG. 1 is a functional block diagram of a computer system of the present invention. Computer system 10 includes computer 20, network subsystem 22, and printer 24. Computer 20 is a general purpose computer that supports one or more users engaged in conventional office and industrial computing tasks. Peripheral equipment and other computer systems, not shown, are interconnected by network subsystem 22 for transmitting, receiving, and storing messages. Computer 20 generates messages directing printing of pages on printer 24. Printer 24 is connected to network subsystem 22 for receiving such messages. In addition to receiving messages, printer 24 generates status and communications control messages received by network subsystem 22 and computer 20. Messages received and sent by printer 24 conform in one embodiment to conventional standard protocols including, for example, the product sold under the trademark "Postscript" by Adobe, the printer control language sold under the trademark "PCL" by Hewlett-Packard, and ASCII. In other embodiments, network protocols are also supported including, for example, SNMP and NFS.

Network subsystem 22 includes conventional network interfacing, processing, and control equipment. In an alternate embodiment for a single user, network subsystem 22 is omitted in favor of a direct connection between computer 20 and printer 24.

Printer 24 includes processor 30, memory 32, and print engine 34. Processor 30 and memory 32 include conventional machine control circuity. In one embodiment, these functional blocks use conventional integrated circuitry having one or more microprocessors, read only memory for firmware storage, random access memory for general purpose storage, and interface circuitry for controlling print engine 34 and for receiving exit detection signals from exit detector 36. Paper path 38 is functionally illustrated beginning with paper supply 40 paper handling mechanisms 42 and 44, and exit tray 46. Conventional paper handling mechanisms 42 and 44 route each page through print engine 34 and beside exit detector 36.

In operation, several individual sheets of paper, herein called pages, travel paper path 38. If a paper jam should occur and be recognized by processor 30 by conventional inputs not shown, print engine 34 and paper handling mechanisms 42 and 44 are stopped. Since paper anywhere along the paper path can be damaged by the jam or by manual intervention, often supplied to clear the jam, complete descriptions of pages that have not passed to exit tray 46 are retained in memory 32. Since processor 30 tracks which pages have passed beside exit detector 36, processor 30 retrieves retained pages from memory 32 and directs print engine 34 to reprint them on pages from paper supply 40 after the jam has been cleared.

In FIG. 1, processor 30 with its instruction set, memory 32, firmware contained in memory 32, and read/write storage contained in memory 32 cooperate as means for calculating a memory assessment (to be discussed below), means for comparing the assessment to a limit, means responsive to the assessment for deferring allocation, and means responsive to the assessment for allocating memory. These elements in further cooperation with exit detector 36 cooperate as means for sustaining continuous printing.

Exit detector 36 is a conventional optical transceiver for proximity detection. In alternate embodiments that use media other than paper as discussed herein, exit detector 36 is a conventional proximity detector.

Exit detector 36, processor 30, and firmware contained in memory 32 cooperate as means for detecting production of a printed page. In alternate and equivalent embodiments, detection of production is accomplished by one or more media sensors located within paper path 38. A page is considered at a point beyond which the probability of reprinting for jam recovery is sufficiently low or deallocation of memory is economically attractive.

FIG. 2 is a memory utilization diagram of printer memory 32 shown in FIG. 1 at a time when allocations for a first page and a second page have been made. The complexity of these pages has been simplified for purposes of this description. Allocations for the first page are being retained, since the first page has not yet passed beside exit detector 36.

Blocks S11, S12, B1, B2, and B3 form a complete description of data to be printed on the first page. Any single block describes a portion of a page to be printed. Blocks S11 and S12 are collectively called an intermediate because they do not contain the complete bit for bit representation to be printed on the first page. Rather, the intermediate is a list of pointers to bit patterns with reference to a region where each bit pattern is to appear on the printed page. Blocks S21 and S22 form the intermediate for the second page, to be printed in sequence after the first page is printed.

Print engine 34, shown in FIG. 1, operates on one strip at a time. The intermediate in this embodiment consists of two strips, S11 and S12, in a linked list. In another embodiment an intermediate of 110 strips fully describes an 8½ inch by 11 inch page. Strip S11 refers to bit patterns B1, B2, and B3. Strip S12 refers to bit patterns B3 and B2. Thus, when a bit pattern is used several times on a page, bit for bit storage for the bit pattern is required only once. In a similar manner, strip S21 refers to bit patterns B1, and B4; and strip S22 refers to bit patterns B5 and B2.

Allocations for strips and bit patterns are shown at memory addresses that were free, i.e. unallocated, and sufficiently large at the time a request was made for their respective allocations. Allocation for the preferred embodiment is on a first fit basis. The first unallocated block that is large enough to satisfy the allocation request is used. In an alternate and equivalent embodiment, a best fit basis is used. There, the unallocated block is used that would leave the smallest residual unallocated block after the request is satisfied. Here, the first fit basis is preferred for simplicity. Further, the location and size of unallocated blocks are identified in a linked list and by a rover pointer. The rover pointer and linked list are of a type described in "The Art of Computer Programming, Volume 1/Fundamental Algorithms," by Donald E. Knuth at pages 435 through 455, and 596 through 605, incorporated herein by reference.

Figure 3:
FIG. 3 is a memory utilization diagram of the memory of a conventional printer at a time, when allocations for two complete pages and a part of a third page have been made.

FIG. 3 is a memory utilization diagram of the memory of a conventional printer at a time when allocations for two complete pages and a part of a third page have been made. Similarities between FIGS. 2 and 3 were kept merely to focus attention on problems in the related art.

For purposes of illustration, the third page requires at least three blocks, X, Y, and Z. Unallocated blocks apparent in FIG. 2 have been allocated to two blocks, X and Y. However, no unallocated memory exists to satisfy the request to allocate a third block, Z, not shown. A memory-out condition, therefore, exists at the time represented in FIG. 3.

FIG. 4 is a memory utilization diagram, of the printer memory shown in FIG. 1, at a time after the time in FIG. 2, when allocations for a first page have been deallocated and allocations for part of a third page have been made. To process the third page, a block is first needed for intermediate strip S31 that refers to existing bit patterns B3 and B5. Next a block is needed for intermediate strip S32, and, finally, a block for unique bit pattern B6. In the illustrated embodiment, all allocations for the third page are preceded by assessment of memory conditions.

Instead of starting processing of the third page, processor 30 first assesses the extent of memory fragmentation and memory utilization. This assessment will be described at length with reference to FIG. 5, below. When the memory assessment does not compare favorably to a limit, processor 30 waits until the first page passes beside exit detector 36. On receipt of signals from exit detector 36, processor 30 deallocates strips S11 and S12 because they are no longer needed for jam recovery. The complete description of the third page, strips S31 and S32 and bit patterns B3, B5, and B6 can now be maintained in memory. The memory-out condition described with reference to FIG. 3 was avoided. Continuous printing was sustained without interruption from a memory-out condition.

FIG. 5 is a flow chart of a method of the present invention. The method begins at step 110 when the description of a current page is completed. Completion is indicated when printer 24 receives a form-feed character from network subsystem 22. Completion is also indicated when data sufficient for a page has already been received and additional data is received which consequently must be placed on a next page.

At step 115, a memory assessment is calculated. In the preferred embodiment, the memory assessment MA is calculated with reference to the respective sizes of every unallocated block according to the following formula:

$$MA = 0.5 * \frac{\sigma}{MFS} + 0.5 * \frac{FS}{MFS}$$

In this formula, sigma represents the standard deviation of currently unallocated block sizes. Sigma is normalized to a value between zero and one by dividing sigma by the maximum block size, i.e. the physical maximum free space, MFS, when no blocks are allocated. This term is sensitive to the extent of memory fragmentation.

Current free space, FS, is the sum of the sizes of all currently unallocated blocks. By dividing FS by MFS, the portion of maximum free space that is currently unallocated is found with a value between zero and one.

Memory assessment, MA, is the weighted sum of two terms. Each term is given equal weight by multiplying each by one half. Other weights are used in alternate and equivalent embodiments. By weighting each term by one half, MA is equally sensitive to memory fragmentation as indicated by the first term and memory utilization as indicated by the second term.

At step 120 MA is compared to a limit. The limit is a predetermined quantity between 0 and 1. In alternate embodiments, the limit is calculated in response to measures and estimates of future demands on memory.

When the comparison is favorable, indicated by large values of MA, allocation and processing of a new page follow immediately beginning with step 130. On the other hand, when comparison is not favorable, no memory is allocated for a new page. After waiting for a trigger event at step 125, control then passes to step 130 for allocation of memory and for processing of the new page.

In one embodiment, detection of a page beside exit detector 36 generates a hardware interrupt that terminates the wait at step 125. In alternate and equivalent embodiments, the wait is terminated by equivalent software interrupts when memory is deallocated by processor 30 when discarded by other cooperating routines. For example, in one embodiment, memory is deallocated by a communications routine when the original message is no longer needed. In another embodiment, one or more bit patterns in memory are deallocated when the time to recreate them is sufficiently small compared to the time spent waiting at step 130. In yet another embodiment, a bit pattern or an intermediate may be evaluated and stored in a less memory extensive representation with a trigger occurring on completion. In still another embodiment, memory is defragmented by a routine that moves allocated blocks. By moving blocks, unallocated memory coalesces and fragmentation is relieved. In such an embodiment a software interrupt is generated when blocks successfully coalesce. In still another embodiment, waiting in response to comparing is terminated by lapse of a predetermined time. Such a timer is one embodiment is independent of exit detector 36 and exit detector 36 is omitted. Such a timer in another embodiment starts when production of a printed page is reasonably certain as indicated by a detector upstream in paper path 38.

In the embodiment shown in FIG. 5 the trigger event is presumed to coincide with an improvement in the memory assessment sufficient for allocating memory for next page processing. An alternate embodiment supports systems wherein this presumption should be verified. In such an embodiment, control passes from step 125 back to step 115 instead of directly to step 130 as shown. By verifying that the post-trigger memory assessment is sufficient, false start allocations, with resulting fragmentation, are avoided.

Methods of the present invention have been discussed with reference to a page printer with jam recovery. These methods also apply with similar benefits to printers without jam recovery wherein assessment of memory utilization and fragmentation improves the cooperation of multiple computational, storage, and interface control processes within the printer.

The foregoing description discusses preferred embodiments of the present invention, which may be changed or modified without departing from the scope of the present invention. For example, parametric descriptions of regions of the printed page are equivalent to bit patterns discussed above. Parametric descriptions are conventionally used, for example, to represent ASCII characters, parameters for a built in hardware character generator, scalable font characters, portions of graphics regions expressed in vector graphics form, and other conventional algorithmic bit pattern descriptions.

Still further, those skilled in the art will understand that use of means and methods of the present invention for printing on film and other conventional media is equivalent to printing on paper pages as discussed in the illustrative embodiments above.

These and other changes and modifications are intended to be included within the scope of the present invention.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure and practice of the invention to one of ordinary skill in the art to which the invention applies.

The words and phrases used in the claims are intended to be broadly construed. A "processor" refers generally to electrical computational apparatus and includes but is not limited to a packaged integrated circuit, an unpackaged integrated circuit, a combination of packaged or unpackaged integrated circuits or both, a microprocessor, a microcontroller, a sequential machine, combinations thereof, and equivalents. "Memory" refers generally to information storage devices including a magnetic storage device, an optical storage device, a semiconductor memory, a register, a charge coupled device, combinations thereof, and equivalents. A "standard deviation" includes, but is not limited to, a measure of the variation in all members of a population or the variation of a set of samples taken from a population. A conventional standard deviation, for example, is the square root of the variance. A "variance" includes, but is not limited to, the conventional variance of a population or of a set of samples taken from a population. "Average" includes all conventional techniques, for example, mean, and weighted average.

What is claimed is:

1. A method, performed by a printer, for avoiding memory fragmentation in the printer wherein the method comprises in sequence:

assessing, prior to processing a next page to be printed, an extent of memory fragmentation to provide a quantitative memory assessment;

comparing the assessment to a limit;

postponing allocation in response to the comparison; and allocating memory for describing a portion of the next page to be printed; whereby further memory fragmentation is avoided by postponing memory allocation when the assessment indicates subsequent memory requests may be denied.

2. The method of claim 1, further comprising: during postponing, retaining in memory, for jam recovery, a description of a page to be printed.

3. The method of claim 1 further comprising:

waiting, in response to the step of comparing, for memory to be deallocated before performing the step of allocating memory.

4. The method of claim 3 wherein deallocation is in response to detecting production of a printed page.

5. The method of claim 1 wherein the assessment comprises a sum, and the sum comprises a square of an unallocated block size.

6. The method of claim 5 wherein the assessment further comprises a standard deviation of a plurality of unallocated block sizes.

7. A method for avoiding memory fragmentation in a printer wherein the method comprises in sequence:

comparing a memory assessment to a limit, wherein the assessment comprises an average comprising a first ratio and a second ratio, the first ratio comprising: a standard deviation of a plurality of unallocated block sizes, divided by a sum comprising allocated block sizes and the plurality; and the second ratio comprises the plurality divided by the sum; and allocating memory for describing a portion of a next page to be printed.

8. A method, performed by a printer, for managing memory allocation for printing sequential pages, the method comprising:

receiving a first message that describes a first region of a first page to be printed;

allocating a first block for storing a first description of the first region;

allocating a second block for storing a second description, the second description describing the first page, the description comprising a pointer to the first block;

assessing an extent of memory fragmentation to provide a quantitative memory assessment; and comparing the assessment to a limit before allocating a third block; whereby managing memory allocation during printing reduces interruptions in sequential page printing.

9. The method of claim 8 wherein the step of comparing is responsive to determining that the first page is fully described.

10. The method of claim 8 wherein the third block is for storing a third description, the third description describing a second region of a second page to be printed after the first page is printed.

11. The method of claim 8 wherein the third block is for storing a third description, the third description describing a second page to be printed after the first page is printed.

12. The method of claim 8 further comprising waiting for the first block to be deallocated before allocating the third block.

13. The method of claim 12 wherein deallocation of the first block is responsive to detecting production of the first page.

14. The method of claim 8 further comprising deallocating the second block in response to the step of comparing.

15. The method of claim 14 wherein allocating the third block is responsive to deallocating the second block.

16. The method of claim 8 wherein the assessment comprises a sum, and the sum comprises a square of an unallocated block size.

17. The method of claim 16 wherein the assessment further comprises a standard deviation of a plurality of unallocated block sizes.

18. A method for managing memory allocation for printing sequential pages, the method comprising:

receiving a first message that describes a first region of a first page to be printed;

allocating a first block for storing a first description of the first region;

allocating a second block for storing a second description, the second description describing the first page, the description comprising a pointer to the first block; and comparing a memory assessment to a limit before allocating a third block, wherein the assessment comprises an average of a first ratio and a second ratio, the first ratio comprising: a standard deviation of a plurality of unallocated block sizes; divided by a sum of allocated block sizes together with the plurality; and the second ratio comprises the plurality divided by the sum.

19. A printer comprising:

a. a memory in operation comprising:
   (1) a first allocated block that stores a first description that describes a first page; and
   (2) a list of unallocated block sizes;

b. a processor, coupled to the memory, wherein the processor prepares the first description, computes a quantitative memory fragmentation assessment responsive to a plurality of sizes from the list, waits when the assessment exceeds a limit, then allocates at least a portion of an unallocated block from the list for processing a second page; and c. a print engine, responsive to the processor, for printing the second page; whereby continuous printing is sustained by waiting before allocating memory when the assessment indicates allocating memory may give rise to interrupted printing.

20. The printer of claim 19 wherein the print engine, in further response to the processor, when interrupted during printing of the first page, reprints the entire first page followed by the second page.

21. The printer of claim 19 wherein the assessment comprises a variance.

22. The printer of claim 19 wherein the assessment comprises a standard deviation.

23. The printer of claim 22 wherein the assessment further comprises a normalized standard deviation.

24. A computer system for sustaining continuous printing, the system comprising:

a. a computer that describes a first page to be printed and a second page to be printed in sequence; and b. a printer, coupled to the computer for receiving a description of the first page and a description of the second page, the printer comprising:
   (1) a memory for storing the description of the first page, the memory comprising a plurality of allocated blocks and a plurality of unallocated blocks, each block having a respective block size;
   (2) calculating means for calculating, in response to receiving the description of the second page, a quantitative memory fragmentation assessment, wherein the assessment is responsive to a variance of unallocated block sizes; and
   (3) deferring means, responsive to the calculating means, for deferring memory allocation when the assessment exceeds a limit, thereby avoiding an interruption of printing.

25. The system of claim 24, wherein the assessment further comprises a standard deviation of unallocated block sizes.

26. The system of claim 24, wherein the assessment further comprises an average of a first ratio and a second ratio, the first ratio comprising: a standard deviation of a plurality of unallocated block sizes; divided by a sum of allocated block sizes together with the plurality; and the second ratio comprises the plurality divided by the sum.

27. A processor for sustaining continuous printing by a printer, the processor comprising:

a. calculating means for calculating a quantitative memory fragmentation assessment;

b. comparing means for comparing the assessment to a limit;

c. first means responsive to the assessment for deferring allocation; and d. second means responsive to the assessment for allocating memory; whereby continuous printing is sustained by deferring memory allocation when the assessment indicates allocating memory may give rise to interrupted printing.

28. The processor of claim 27, further comprising detecting means for detecting production of a printed page, wherein the detecting means is responsive to the first means, and the second means is responsive to the detecting means.

* * * * *